United States Patent

Coyle, Jr. et al.

Patent Number: 5,135,555
Date of Patent: Aug. 4, 1992

[54] APPARATUS FOR FABRICATION OF OPTICAL COUPLERS

[75] Inventors: Richard J. Coyle, Jr., Lawrenceville, N.J.; Gary J. Grimes, Thornton; Lawrence J. Haas, Broomfield, both of Colo.; Anthony J. Serafino, Cranbury; George J. Shevchuk, Old Bridge, both of N.J.

[73] Assignee: AT&T Bell Laboratories, Murray Hill, N.J.

[21] Appl. No.: 657,575

[22] Filed: Feb. 15, 1991

Related U.S. Application Data

[62] Division of Ser. No. 454,084, Dec. 21, 1989, Pat. No. 5,026,411.

[51] Int. Cl.$^5$ ............................................. C03C 25/00
[52] U.S. Cl. ................................................ 65/12; 65/1; 65/4.21; 156/304.2; 219/121.82; 385/45
[58] Field of Search ........................ 65/2, 3.11, 3.2, 4.2, 65/4.21, 4.3, 12, 1, 10.2, 292, 174, 269; 350/96.15, 96.18, 96.21; 264/261; 156/158, 304.2, 502; 219/121.68, 121.7, 121.82; 385/45, 52

[56] References Cited

U.S. PATENT DOCUMENTS

| | | | |
|---|---|---|---|
| 4,248,499 | 2/1981 | Liertz et al. | 350/96.21 |
| 4,296,995 | 10/1981 | Bickel | 350/96.15 |
| 4,360,248 | 11/1982 | Bickel et al. | 350/96.16 |
| 4,598,039 | 7/1986 | Fischer et al. | 156/272.8 |
| 4,626,652 | 12/1986 | Bjork et al. | 350/96.29 |
| 4,664,732 | 5/1987 | Campbell et al. | 350/96.15 |
| 4,682,843 | 7/1987 | Mahlein et al. | 350/96.15 |
| 4,725,110 | 2/1988 | Glenn et al. | 350/96.19 |
| 4,749,248 | 6/1988 | Aberson et al. | 350/96.19 |
| 4,784,452 | 11/1988 | Hodge et al. | 350/96.15 |
| 4,793,680 | 12/1988 | Byron | 350/96.19 |
| 4,898,444 | 2/1990 | Grimes et al. | 350/96.15 |
| 4,932,989 | 6/1990 | Presby | 65/2 |

FOREIGN PATENT DOCUMENTS

| | | |
|---|---|---|
| 56-126818 | 10/1981 | Japan . |
| 63-163308 | 7/1988 | Japan . |
| 63-208813 | 8/1988 | Japan . |
| 0121404 | 1/1989 | Japan . |
| 0184928 | 3/1989 | Japan . |

OTHER PUBLICATIONS

Znotins et al., Excimer Lasers: An Emerging Technology in Materials Processing, Laser Focus/Electro-Optics, May 1987, pp. 54-70.

Primary Examiner—Kenneth M. Schor
Assistant Examiner—John J. Bruckner
Attorney, Agent, or Firm—John C. Moran

[57] ABSTRACT

A method for fabricating a high efficiency optical coupler by matching the emerging light exit pupil from a coupler opening to the acceptance shape of a couple optical fiber. An excimer laser forms the coupler opening in an optical fiber by removing cladding from the optical core surface. The coupler opening has an elliptical shape resulting in an emerging light exit cone, and that exit cone matches an acceptance cone of a circular coupler optical fiber.

7 Claims, 5 Drawing Sheets

APPARATUS FOR FABRICATION OF OPTICAL COUPLERS

This is a division of application Ser. No. 07/454,084 filed Dec. 21, 1989 now U.S. Pat. No. 5,026,411.

TECHNICAL FIELD

This invention relates to optical coupler fabrication on an optical fiber bus and, in particular, to the fabrication of optimal openings in the cladding of the optical fiber bus.

BACKGROUND OF THE INVENTION

A problem that exists in the art is to provide optical couplers that efficiently communicate light to or from an optical fiber bus. Many factors effect this efficiency, but the most important factor is the need to match the size and shape of the exit pupil of light emerging from the optical fiber bus to the acceptance shape of the optical coupler fiber in the optical coupler. For a circular optical coupler fiber, the acceptance shape is a cone resulting in the exit pupil also being a cone. The optical coupler fiber is also referred to as a launch tap, drop tap, or collecting fiber.

Mechanical stripping methods are known for fabricating to the coupler openings in the cladding. These methods remove the cladding by physically scraping the cladding from the core. In addition, chemical etching methods have been utilized to remove the cladding form the optical core. Both mechanical stripping and chemical etching methods are limited because of their inability to fabricate the correct coupling opening size and shape. In fact, no attempt has been made with these methods to match the exit pupil of the emerging light with the acceptance shape of the coupler fiber.

U.S. Pat. No. 4,626,652 discloses a method for fabricating optical couplers that utilizes a laser to remove nearly all of the cladding from a fiber. The laser beam scans back and forth across the region resulting in the removal of a linear portion of the cladding. Using this method, two optical fibers are prepared and are fused together by applying heat, forming an optical coupler. Again, no attempt is made to match the exit pupil of emerging light with the acceptance shape of the coupler fiber.

SUMMARY OF THE INVENTION

The aforementioned problem is solved and a technical advance is achieved in the art by fabrication of a coupler opening in the cladding of an optical fiber bus that matches the exit pupil of light emerging from the coupler opening with the acceptance shape of a coupler fiber. For a circular coupler fiber, the acceptance shape is an acceptance cone, and the exit pupil is an exit cone. Further, the exit pupil matches the physical aperture of the coupler fiber. In a preferred embodiment for a circular coupler fiber, the coupler opening in the cladding is an elliptical opening with the major axis parallel to that of the optical fiber bus. The light emerging from the elliptical opening is substantially an exit cone that matches the acceptance cone of the circular coupler fiber. The cladding removal is achieved by a precisely aimed excimer laser using carefully controlled power. Advantageously, the cladding is of a polymer material which can be readily ablatively removed by the excimer laser; and the optical core is of a material which cannot be substantially effected by the excimer laser.

In the preferred embodiment of the invention, a coupler housing is prepositioned on the optical bus. The housing provides the following: (1) An alignment point for positioning the laser and lens over an housing opening at a coupler site; (2) A positioning and support device for a coupler fiber precisely aligned with the coupler site; (3) Vents that allow the housing at the coupler fiber and coupler opening to filled with a junction media which physically secures the tap fiber to the housing and communicates light to and from the optical bus core; (4) A cavity in the region opposite the couplers opening that allows the repair of any cladding damage, which results in light loss, caused by the laser. Vents in this cavity allow the cavity to be filled with material having substantially the same refractive index as the cladding.

Other and further aspects of the present invention will be come apparent during the course of the following description and by reference to the accompanying drawing.

BRIEF DESCRIPTION OF THE DRAWING

Referring now to the drawing.

DETAILED DESCRIPTION

Figure 1:
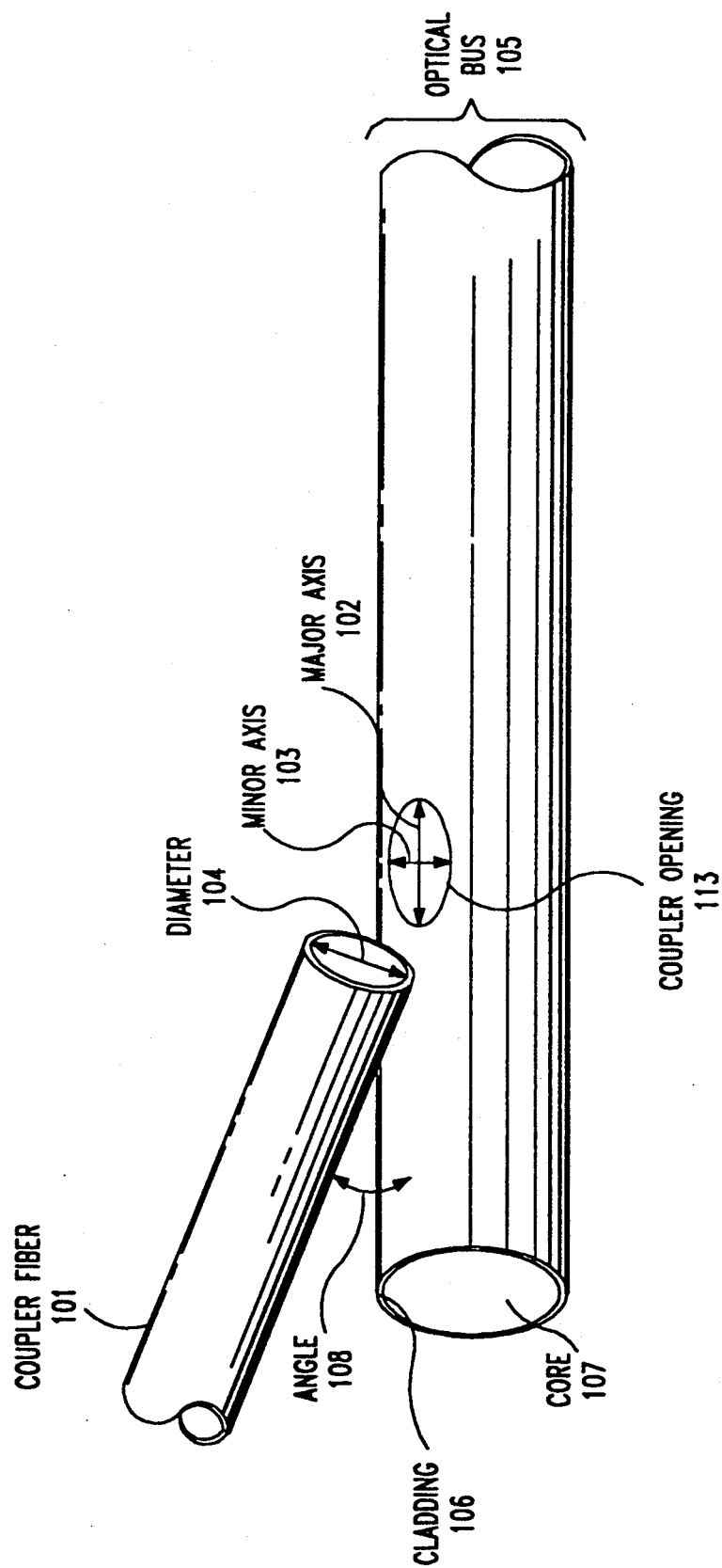
FIG. 1 illustrates an embodiment of an optical coupler in accordance with the present invention.

In accordance with the invention, FIG. 1 illustrates an embodiment where the shape of coupler opening 113 results in an exit pupil of light emerging from coupler opening 113 that matches the acceptance shape of coupler fiber 101. Since coupler fiber 101 is a circular fiber, the acceptance shape is an acceptance cone, and the exit pupil is an exit cone. The merging light exit pupil also matches the physical aperture of coupler fiber 101. Although not shown so as to illustrate clearly opening 113, a junction media is used to communicate light between opening 113 and coupler fiber 101. Coupler opening 113 is formed by ablatively removing cladding 106 from the surface of core 107. For circular coupler fiber 101, coupler opening 113 has an elliptical shape resulting in an merging light exit cone. Major axis 102 is advantageously equal to approximately 1.2 millimeters (mm), and minor axis 103 is advantageously equal to approximately 0.6 mm. Diameter 104 is advantageously equal to approximately 1 mm, and angle 108 is determined by the refractive indexes of the junction media and core 107 using well known techniques. The emerging light exit cone and acceptance cone can be determined by ray tracing which can be accomplished by using the Beam Three Ray Tracing software package from Stellar Software, Berkeley, Calif.

Figure 2:
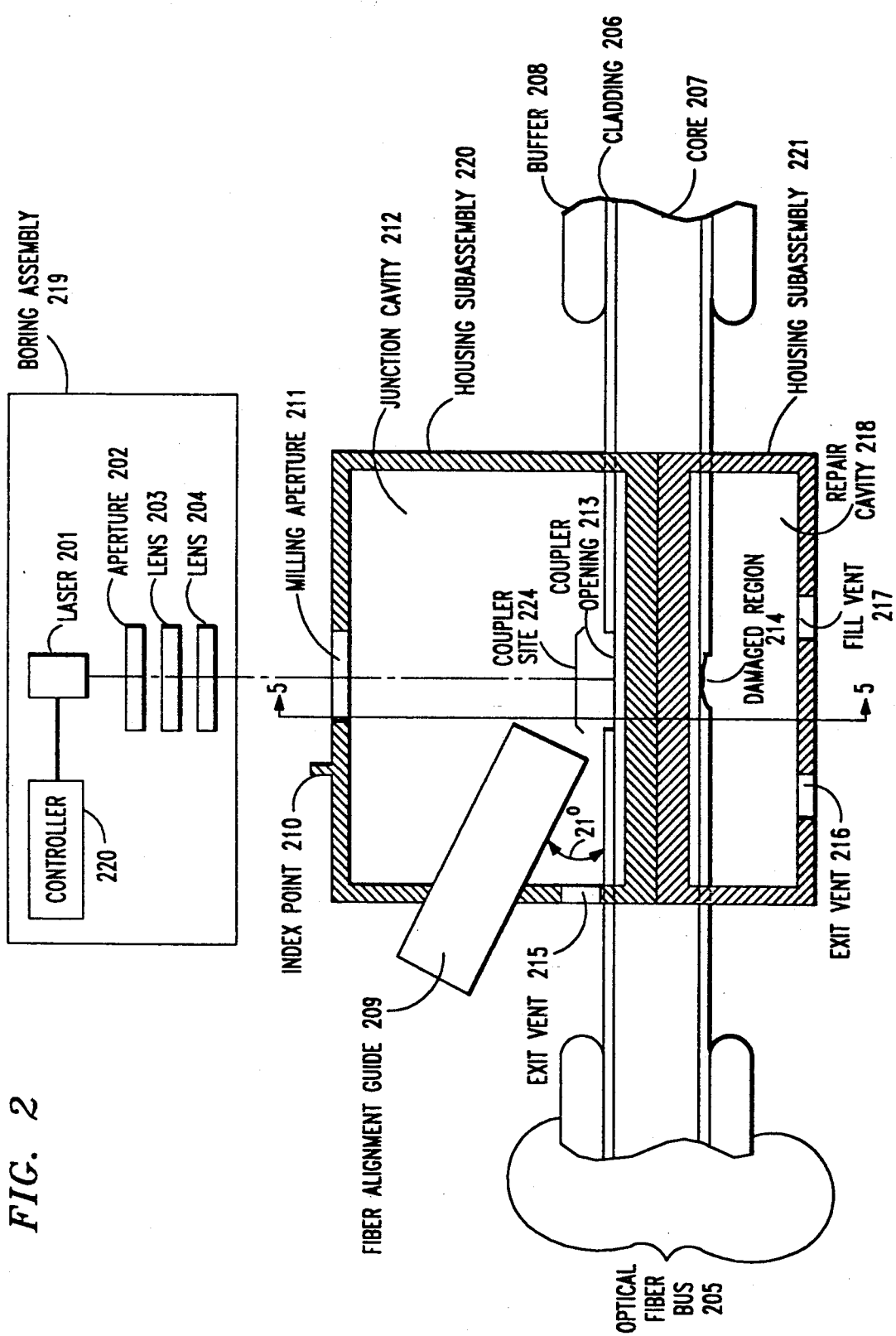
FIG. 2 illustrates a view of an apparatus for fabricating optical couplers on an optical fiber bus in accordance with the present invention.
Figure 4:
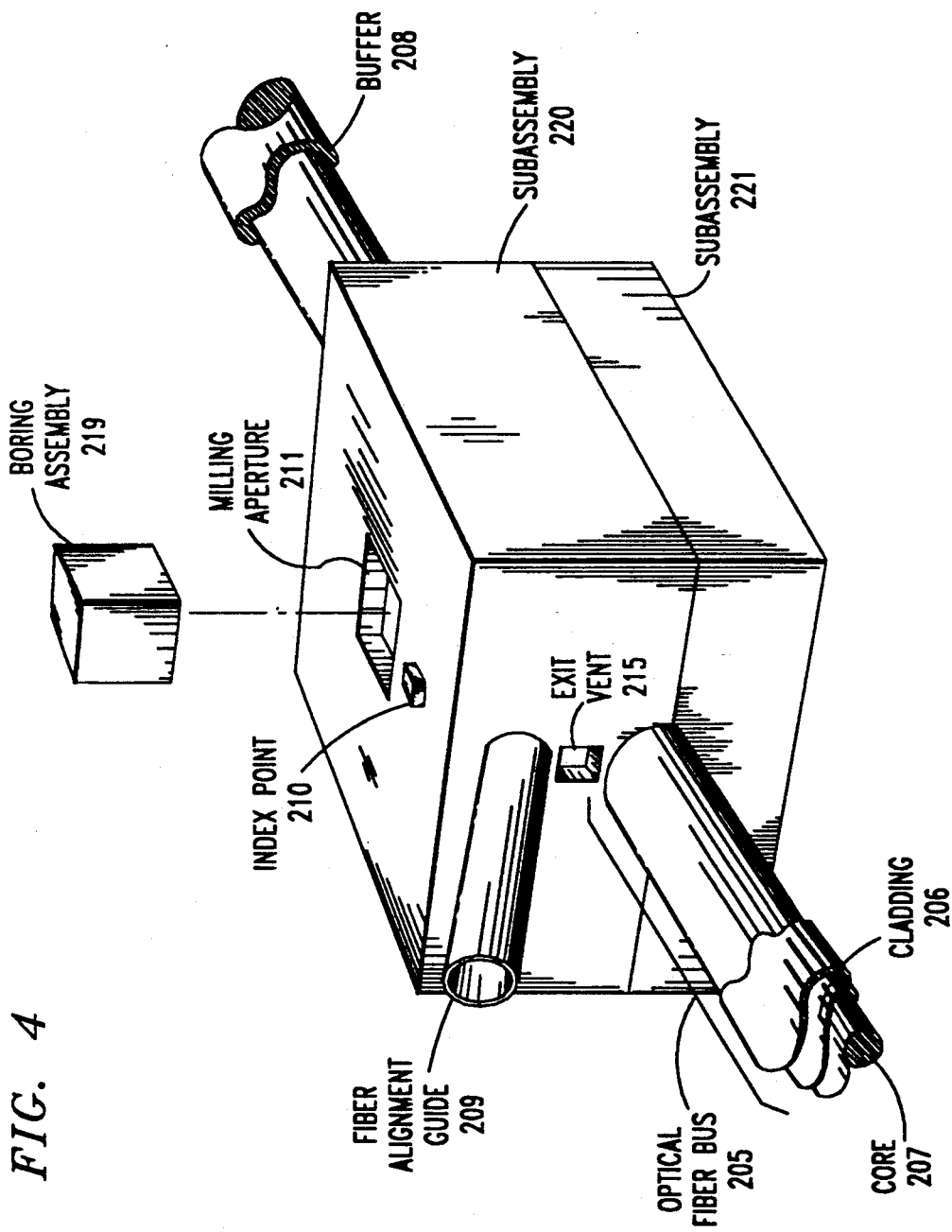
FIG. 4 illustrates a housing in accordance with the present invention.

FIG. 2 illustrates a cross-sectional view of an apparatus for fabricating optical couplers on an optical fiber bus in accordance with the present invention. FIG. 4 illustrates a drawing o the apparatus of FIG. 2. As illustrated in FIG. 2, buffer 208 is removed form a region of optical fiber bus 205 exposing cladding 206. Housing subassemblies 220 and 221 are attached in this exposed region resulting in a portion of the cladding of optical fiber bus 205 being totally surrounded by these two subassemblies. The subassemblies are secured to each other using convention methods, such as gluing.

Subassembly 220 provides milling aperture 211 which allows the laser beam of boring assembly 219 to pass through subassembly 220 to form coupler opening 213 by ablatively removing cladding 206 at coupler site 224. Controller 220 controls excimer laser 201 to operate advantageously at a wavelength of 193 nanometers (nm) to ablate cladding material 206 from optical fiber bus 205 without damaging optical core 207. Laser 201 may advantageously be a Questek Model 2660 laser.

In accordance with the invention, the beam of laser 201 is advantageously first formed into an elliptical shape by aperture 202 and then imaged through a 4:1 telescope formed by lenses 203 and 204. The focal length of the lenses is adjusted for a wavelength of 193 nm. An image one-fourth the original size of the aperture is formed at the focal point of lens 204. For example, Aperture 202 having a major axis of 4.8 mm and a minor axis of 2.4 mm forms an elliptical image having a major axis of 1.2 mm and a minor axis of 0.6 mm at the focal point of lens 204. Laser 201 is operated in the pulse mode. The energy density at the coupler sit is advantageously in the range of 5 to 10 milliJoules/mm$^2$. At a repetition rate of one pulse/sec., approximately 40 to 80 pulses are required to produce elliptical holes as defined by aperture 202. Optical core 207 is 1mm in diameter; cladding 206 is a 10-15 micron thick organic cladding; and buffer 208 is a 200 micron thick organic coating. Illustratively, the optical core 207 is glass, and cladding 206 is fluoridated acrylate.

Figure 3:
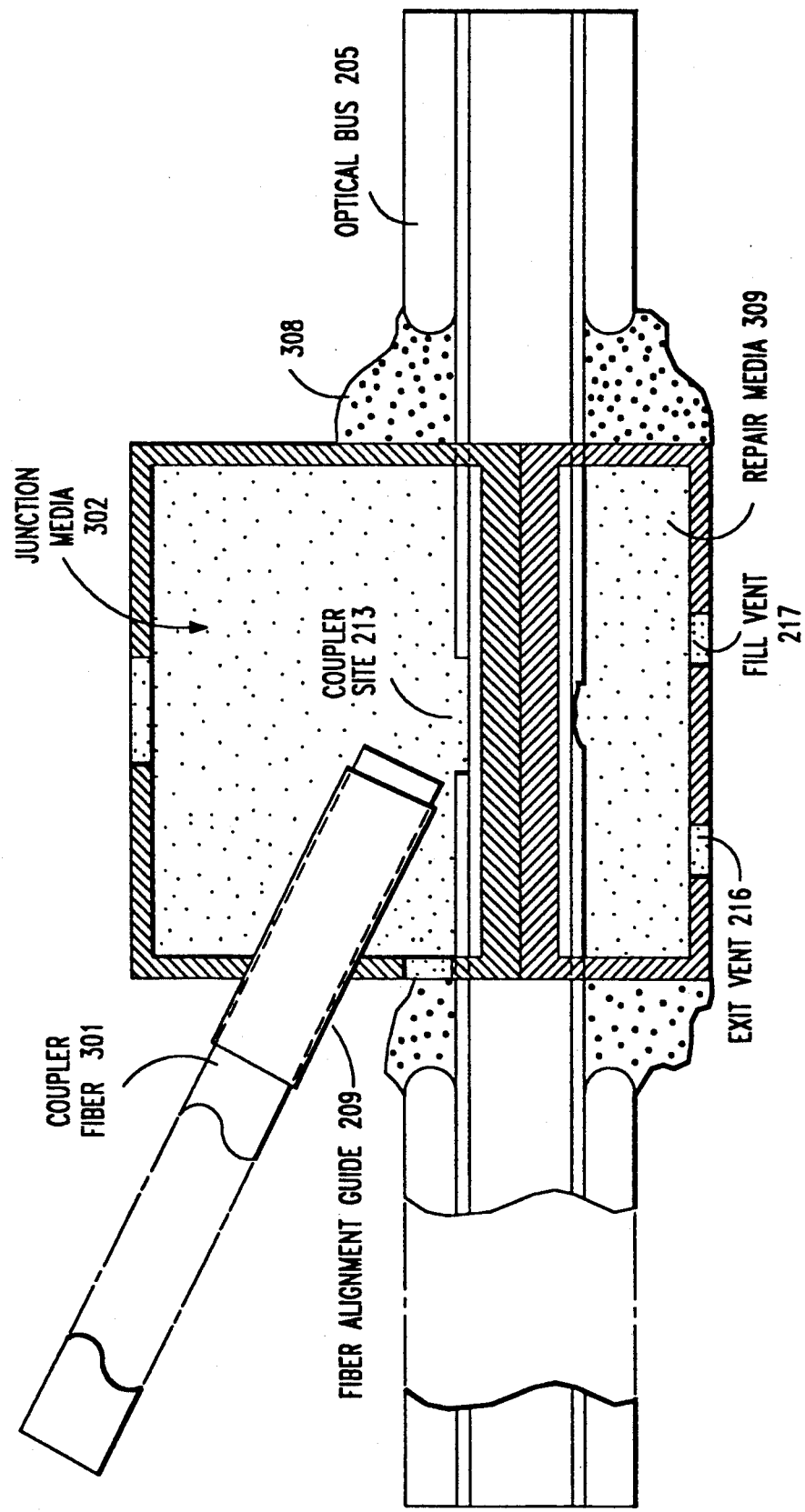
FIG. 3 illustrates a fabricated optical coupler in accordance with the present invention.

After coupler opening 213 has been formed, coupler fiber 301 is inserted into fiber alignment guide 209 as illustrated in FIG. 3. After insertion of the coupler fiber, junction media 302 is injected into junction cavity 212 (illustrated in FIG. 2), completely filling the junction cavity. If light is to be extracted from coupler opening 213, the junction media has a higher index of refraction than core 207. If light is to be launched from the coupler fiber into core 207 via the coupler opening, the junction media has a higher index of refraction than cladding 206. The junction media is injected into junction cavity 212 via aperture 211 as illustrated in FIG. 2, and the air in the cavity is exhausted through exit vent 215. As illustrated in FIG. 3, junction media 302 not only transmits light to or from coupler fiber 301 but also physically secures the portion of coupler fiber 301 which extends from fiber alignment guide 209 into junction cavity 212.

During the ablation of coupler opening 213 by laser 201, some of the energy is transferred through core 207 damaging the cladding on core 207 opposite coupler site 224. This damage is illustrated as damaged region 214. Having substantially the same index of refraction as cladding 206, repair material 309 is injected into repair cavity 218 via fill vent 217. The air from repair cavity 218 is exhausted via vent 216. In addition, FIG. 3 illustrates that a damaged portion of buffer 208 can be repaired wit material 308.

Figure 5:
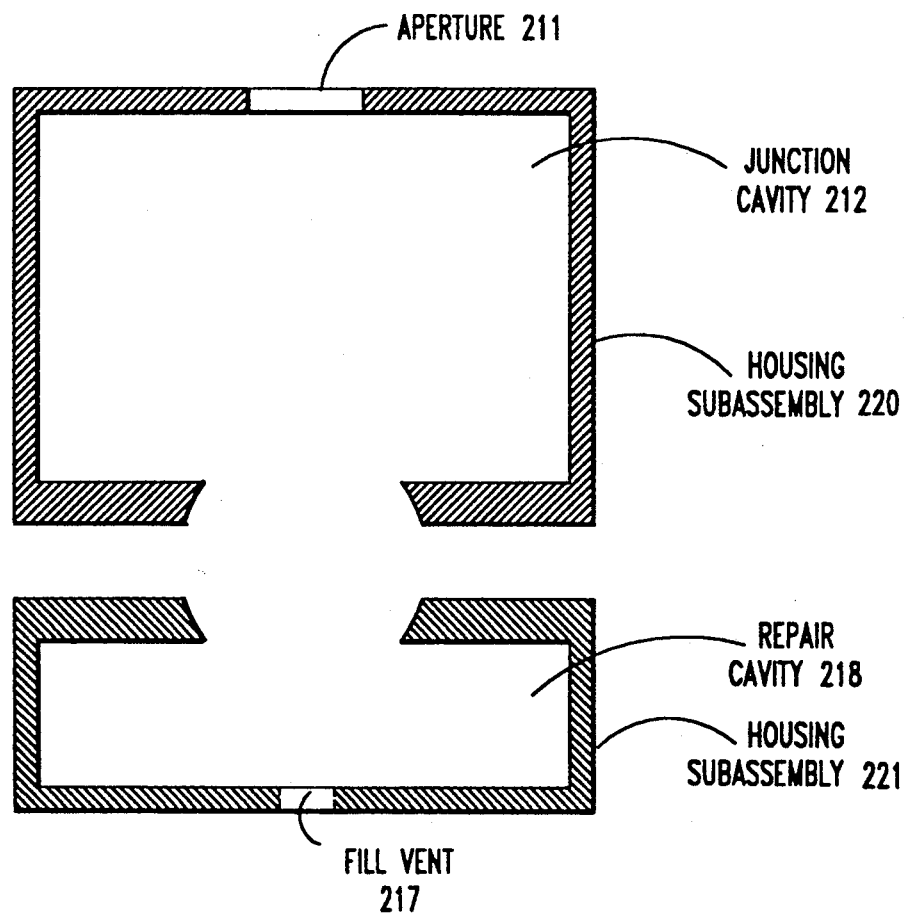
FIG. 5 illustrates a cross-sectional view of subassemblies 220 and 221 of FIG. 4.

FIG. 4 illustrates a housing utilized to fabricate couplers in an optical fiber bus in accordance with the invention. Details of subassemblies 220 and 221 are given in the cross-sectional view of FIG. 5.

It is to be understood that the above-described embodiment is merely illustrative of the principles of the invention and that other arrangements may be devised by those skilled in the art without departing from the spirit and scope of the invention. In particular, other exit pupils can be formed by appropriate coupler openings to match the acceptance shapes of optical coupler fibers other than a circular fiber. For example an exit pupil in the shape of a pyramid matches the acceptance shape of a square coupler fiber. The aforementioned ray tracing techniques may reveal shapes other than symmetrical ellipses as being ideal for round optical fiber buses and tap fibers having various relative diameters, relative positions, numerical apertures, and mode power distributions. Further, other methods for making coupler openings are envisaged.

We claim:

1. An apparatus for fabricating an optical coupler on an optical fiber having an optical core surrounded by a cladding, comprising:

a first optical fiber having an optical core surrounded by a cladding;

means for first forming an opening in said cladding of said first optical fiber that is approximately elliptical in shape at a coupler site on said first optical fiber so that light emerging from said opening has a predefined exit cone said means for first forming an opening being positioned so as to form said approximately elliptical shape at said coupler sight;

a coupling optical fiber having a free end with an aperture; and means for finally positioning at said coupler site said free end of said coupling optical fiber wherein said free end has an acceptance cone substantially matching said predefined exit cone of said emerging light.

2. The apparatus of claim 1 wherein said predefined exit cone substantially matches the shape of the aperture of said free end.

3. The apparatus of claim 2 wherein said first forming means comprises means for aligning the major axis of said opening with the axis of said first optical fiber.

4. The apparatus of claim 3 wherein said means for first forming further comprises means for removing said cladding by using a laser.

5. The apparatus of claim 4 wherein said laser is an excimer laser.

6. The apparatus of claim 5 wherein said means for first forming comprises a housing to support and align said coupling optical fiber.

7. The apparatus of claim 6 further comprising means for securing said coupling optical fiber to said housing with a junction media.

* * * * *